Aug. 3, 1965  E. F. STAVER  3,197,915
MAGNETIC BOX FOR FERROUS ITEMS
Filed Jan. 2, 1964
FIG. 1
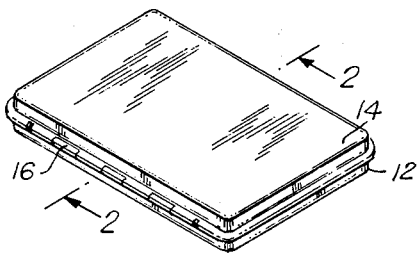
FIG. 2
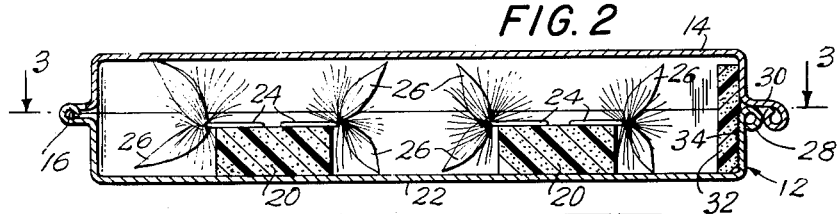
FIG. 3
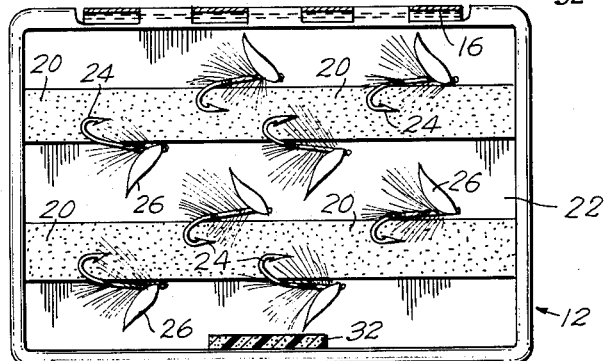
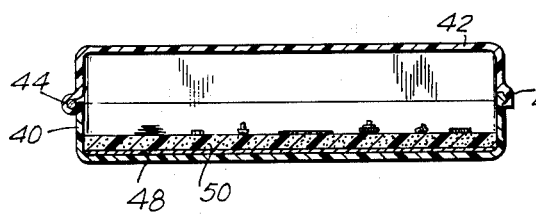
FIG. 4
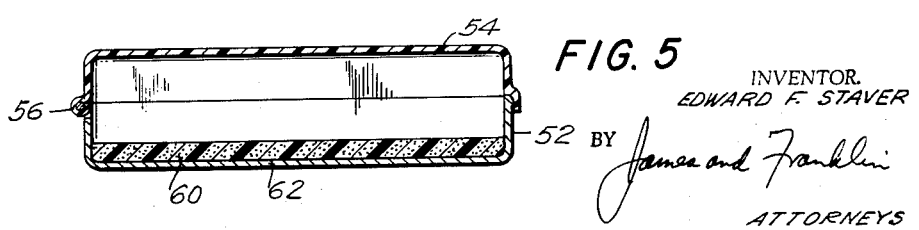
FIG. 5
INVENTOR.
EDWARD F. STAVER
BY
ATTORNEYS United States Patent Office 3,197,915
Patented Aug. 3, 1965

3,197,915
MAGNETIC BOX FOR FERROUS ITEMS
Edward F. Staver, Westport, N.Y., assignor to Staver Westport Incorporated, Westport, N.Y., a corporation of New York
Filed Jan. 2, 1964, Ser. No. 335,146
2 Claims. (Cl. 43—57.5)

This invention relates to a magnetic box for ferrous items, and more particularly for fish hooks for fly fishing.

The general object of the invention is to improve boxes for holding ferrous items. A more particular object is to provide an improved box for holding fish hooks for fly fishing, the hooks being held in spaced-apart relation for protection, to avoid tangling, and for visible display for easy selection of a desired fly.

Fish hooks for fly fishing are fitted with delicate feathers or wings, and a further object is to provide a box which supports the hooks in such fashion that the feathers are protected against unnecessary flattening or crushing.

The magnetic portion of the box is preferably a plastic loaded with permanently magnetized powder, and a further object is to improve the holding power of the magnetized material by insuring the formation of closed magnetic flux paths or loops.

To accomplish the foregoing general objects, and other more specific objects which will hereinafter appear, my invention resides in the magnetic box elements and their relation one to another, as are hereinafter more particularly described in the following specification. The specification is accompanied by a drawing in which:

FIG. 1 is a perspective view showing a ferrous sheet metal box embodying features of my invention;

FIG. 2 is a transverse section taken approximately in the plane of the line 2—2 of FIG. 1;

FIG. 3 is a horizontal section taken approximately on the line 3—3 of FIG. 2;

FIG. 4 is a transverse section like FIG. 2, but showing my invention applied to a molded plastic box; and FIG. 5 is a similar view showing a box in which the body portion is made of ferrous sheet metal, and the cover portion is made of a transparent plastic.

Referring to the drawing, and more particularly to FIG. 1, the box there shown comprises a body 12 and a cover 14 which is preferably hinged as indicated at 16. The body 12 includes a ferrous bottom, and in the present case the entire box is made of a ferrous sheet metal. The sheet metal may be tinned to prevent rust, or may be aluminum coated for the same purpose. These are common and inexpensive but other coatings may be used.

Referring now to FIGS. 2 and 3, a loaded plastic, permanently magnetized material 20 rests on the ferrous bottom 22. This material is preferably magnetized in crosswise or vertical direction, with small adjacent areas oppositely polarized. Ferrous articles 24 may be held in spaced-apart relation in the box by resting the same on the permanently magnetized material 20.

The box here shown is designed to protectively hold fish hooks used for fly fishing. For this purpose the magnetic material 20 is preferably in the form of spaced parallel bars resting on the ferrous bottom 22 of the box. Such magnets are commercially available and are known as rubber magnets or plastic magnets. The bars remain in position without cementing, because of the magnetic attraction, but if desired they could be cemented to the bottom. FIG. 3 shows how the flies are spaced apart so that they do not tangle with one another, and are displayed for easy study and selection of a desired fly by the fisherman. Moreover, the delicate simulated wings or feathers 26 may be located in the open spaces between the bars, as clearly shown in FIGS. 2 and 3, thus preventing flattening or crushing of the wings.

The cover may be held closed in any desired fashion. In the present case the rim of the body 12 is outwardly flanged and rolled to present a rounded edge 28. The cover is outwardly flanged and rolled to present a rounded edge 30 (FIG. 2). A small piece of permanently magnetized material 32 may be used as a magnetic latch or holding means. For this purpose it may be cemented to one part of the box, and it is here cemented to the body portion 12, as indicated at 34. The magnetization is crosswise as before.

Another box embodying features of the present invention is illustrated in FIG. 4. One difference is that the box is molded of a plastic material, and is preferably transparent. There is a body 40, and a cover 42, hinged to the body at 44. The opposite side of the cover may be molded to provide a snap engagement means indicated at 46. Because the body 40 is non-ferrous it is provided with an extra ferrous bottom, and for this purpose a piece of ferrous sheet metal 48 is placed against the bottom. It may be secured by a snug fit around its edges, or by one or more dabs of cement between the metal sheet and the bottom of the box. The metal may be conventional rolled ferrous sheet metal, and it is preferably tinned or otherwise coated to prevent rust. Tin plate used for cans is inexpensive and satisfactory.

Another difference illustrated in FIG. 4 is that the loaded plastic, permanently magnetized material is a continuous sheet 50, which extends over the entire bottom of the box. It may be cemented in position, but this is unnecessary because it adheres magnetically to the ferrous sheet 48. Ferrous articles may be held in spaced-apart position in the box by simply resting the same on the material 50. In the illustrated case the items are assumed to be minute screws such as are used by watchmakers or jewelers. A variety of such screws are distributed over the bottom and may be examined for selection of a desired item.

It will be understood that the fish hooks shown in FIGS. 2 and 3 may be used in a box having a flat bottom, as in FIG. 4. The advantage of holding the hooks in spaced-apart and displayed position would be retained, but the advantage of a free space for the lower wings would be lost.

Another box is shown in FIG. 5. In this case the body 52 is made of ferrous sheet metal, while the cover 54 is made of a transparent plastic material. The cover may be a slip cover, without hinges, but is here shown hinged at 56. A snap catch is indicated at 58. The loaded plastic, permanently magnetized material 60 is applied directly to the ferrous sheet metal bottom 62. No cement is neeedd, but a few drops may be employed if desired. This box has the advantage of providing its own ferrous bottom, as in FIG. 2, and it has a transparent cover as in FIG. 4. It may be used for small ferrous items such as the jewelry screws mentioned in connection with FIG. 4. It also may be used for fishing flies. It will be understood that the box of FIG. 4 or the box of FIG. 5 may be fitted with spaced bars of the magnetized material, instead of a continuous sheet, and that conversely an all-metal box such as that shown in FIGS. 1–3 may be provided with a continuous permanently magnetized bottom, as in FIGS. 4 and 5, instead of the spaced-apart bars shown in FIGS. 2 and 3.

The magnetized material may be either rubber or a plastic loaded with barium iron oxide powder or other such ferromagnetic particles. It is permanently magnetized in transverse direction, that is, in vertical direction as shown in FIGS. 2 through 4, and the minute adjacent areas of the material are oppositely polarized.

Thus, when a fish hook or jeweler's screw or other such ferrous item is placed on the plastic material a plurality of closed magnetic flux loops are formed with flux flowing upward into the fish hook, and thence reversely downward through the plastic material to the ferrous bottom, and thence back upward from the ferrous bottom through the plastic material. It is for this reason that in all forms the box includes a ferrous metal bottom, either as an integral part of the box (FIGS. 2 and 5), or as an added or inserted bottom (FIG. 4). This greatly strengthens the magnetic grip of the plastic magnet on the item being held thereby.

Pieces of desired area may be stamped from sheet material, or desired lengths cut from bars. The material has the advantage of flexibility, so that it does not matter if the bottom of the box is not plane.

It is believed that the construction and operation of my improved magnetic box, as well as the advantages thereof, will be apparent from the foregoing detailed description. It will also be apparent that while I have shown and described the invention in several preferred forms, changes may be made without departing from the scope of the invention, as sought to be defined by the following claims. In the claims reference to a ferrous bottom is intended to include either an integral bottom or an extra bottom as described above. Any reference to the plastic material being magnetized vertically assumes the box to be in the normal horizontal position shown in the drawing. The reference to the magnetized material being a loaded plastic is not intended to exclude similarly loaded and magnetized rubber, these magnets being somewhat interchangeably referred to in commerce as either rubber magnets or plastic magnets.

I claim:

1. A fly tackle box comprising a body and a cover hinged on said body, the bottom of said box including ferrous sheet metal, and a plastic permanently magnetized material in the form of bars resting on the ferrous bottom of the box, said material being flexible and loaded with a ferromagnetic powder, said bars being thick in vertical direction and said box being about twice as high as the bars, said bars being disposed in well-spaced parallel relation, whereby steel fish hooks for fly fishing may be held in spaced-apart position in the box by simply resting the hooks flat on the permanently magnetized material with the wings or feathers disposed in the open space between the bars and above the bars, said bars being magnetized in vertical direction with adjacent areas oppositely polarized, whereby a large number of minute closed magnetic loops are completed through the ferrous bottom beneath the bar and through the fish hook on top of the bar.

2. A fly tackle box comprising a body and a cover hinged on said body, the bottom of said box including ferrous sheet metal, and a plastic permanently magnetized material in the form of bars resting on the ferrous bottom of the box, said material being flexible and loaded with a ferromagnetic powder, said bars being disposed in well-spaced parallel relation, whereby steel fish hooks for fly fishing may be held in spaced-apart position in the box by simply resting the hooks flat on the permanently magnetized material with the wings or feathers disposed in the open space between the bars, said bars being magnetized in vertical direction with adjacent areas oppositely polarized, whereby a large number of minute closed magnetic loops are completed through the ferrous bottom beneath the bar and through the fish hook on top of the bar.

References Cited by the Examiner

UNITED STATES PATENTS

| | | | |
|---|---|---|---|
| 1,993,144 | 3/35 | Kasdan | 43—57.5 |
| 2,596,214 | 5/52 | Corkran | 43—57.5 |
| 2,831,289 | 4/58 | Klinghoffer. | |
| 2,959,832 | 11/60 | Baermann | 24—201 |
| 3,150,296 | 9/64 | McIntosh | 317—159 |

SAMUEL KOREN, *Primary Examiner.*

ABRAHAM G. STONE, *Examiner.*